Nov. 21, 1950     D. A. CAMPBELL     2,530,857
FRONT WHEEL MUD GUARD ATTACHMENT FOR TRACTORS
Filed July 1, 1949
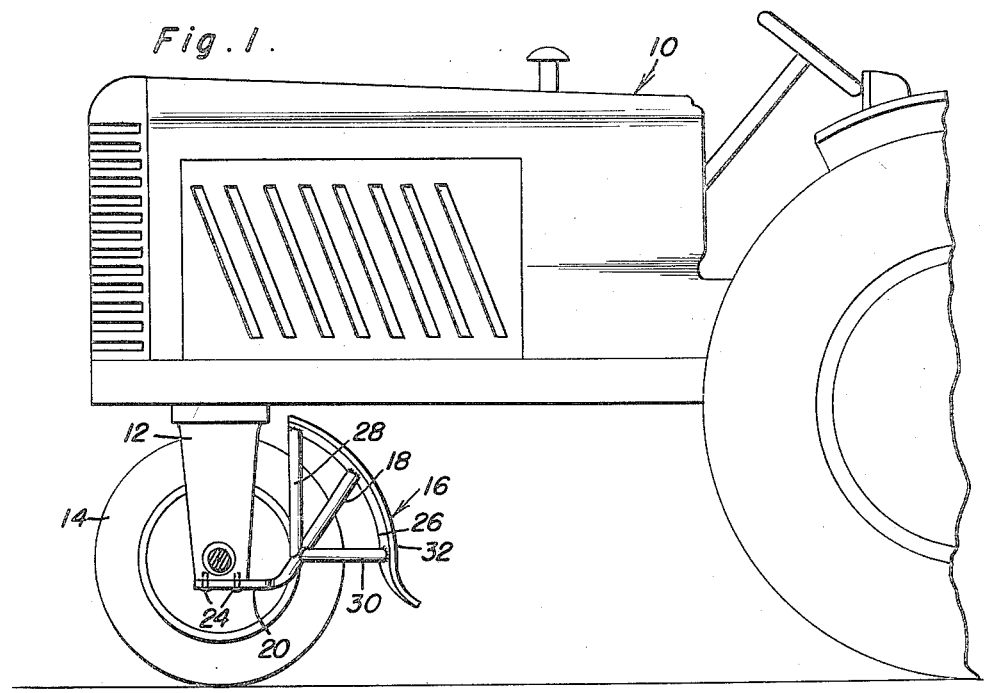
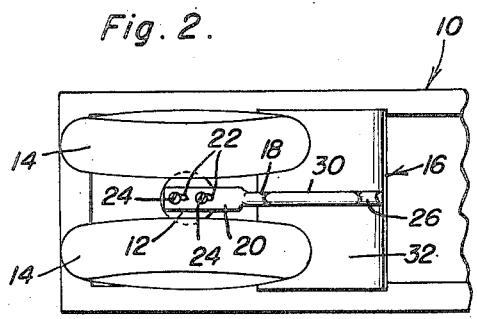
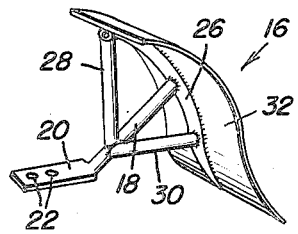
Inventor
Dick A. Campbell
By *Clarence A. O'Brien and Harvey B. Jacobson*
                               Attorneys Patented Nov. 21, 1950

2,530,857

UNITED STATES PATENT OFFICE 2,530,857

FRONT-WHEEL MUDGUARD ATTACHMENT FOR TRACTORS

Dick A. Campbell, Tama, Iowa

Application July 1, 1949, Serial No. 102,645

3 Claims. (Cl. 280—152)

This invention relates to new and useful improvements and structural refinements in tractors, more particularly, tractors of the type having a pair of closely spaced front wheels mounted upon a combined steering and wheel supporting post, and the principal object of the invention is to provide a mud guard for such front wheels, so as to protect the engine as well as other portions of the tractor against splashing water, mud, stones, gravel, etc., such as may be thrown by the front wheels.

This object is achieved by the provision of the instant mud guard which, in the nature of an attachment, may be rigidly secured to the combined steering and front wheel supporting post, this being so arranged that the mud guard is moveable with the post and does not interfere in any manner with the steering of the tractor.

Some of the features of the invention, therefore, reside in the structure of the mud guard per se, while other features reside in the provision of means for attaching the mud guard to the combined steering and front wheel supporting post as aforesaid.

Some of the advantages of the invention lie in its simplicity of construction, in its durability, and in its adaptability to use with tractors of different types.

With the above more important objects and features in view, and such other objects and features as may become apparent as this specification proceeds, the invention consists essentially of the arrangement and construction of parts as illustrated in the accompanying drawings, in which:

Figure 1 is a fragmentary side elevational view of a tractor showing the invention attached to the combined steering and front wheel supporting post thereof;

Figure 2 is a fragmentary underside plan view of the subject shown in Figure 1; and, Figure 3 is a perspective view of the invention per se.

Like characters of reference are employed to designate like parts in the specification and throughout the several views.

Referring now to the accompanying drawings in detail, the general reference character 10 designates a tractor having a combined steering and wheel supporting post 12 which, in turn, is equipped with a pair of closely spaced front wheels 14, as will be clearly apparent.

The invention resides in the provision of a mud guard attachment designated generally by the reference character 16, this embodying in its construction an arm 18 having a substantially flat, horizontal portion 20 provided with a plurality of slots 22 to receive suitable bolts or screws 24 whereby the arm 18 may be securely attached to the lower end of the post 12. In this connection it is to be noted that the lower end of the post is usually formed with screw threaded apertures to receive bolts whereby different cultivating attachments, or the like, may be secured to the bottom of the post, and these same apertures in the post 12 may be used to receive the aforementioned bolts 24 as will be clearly apparent.

The arm 18 is disposed between the front wheels 14 and extends rearwardly and upwardly, its upper end being secured by welding, or the like, to an intermediate portion of an arcuate rib 26. Moreover, a pair of reinforcing struts 28, 30 extend from the end portions of the rib 26 to an intermediate portion of the arm 18, as is best shown in Figures 1 and 3.

An arcuate mud guard panel 32 is secured by welding, or the like, to the rib 26 and projects to both sides of the latter, being disposed in spaced adjacent relation to the periphery of the wheels 14, substantially as shown in Figure 1.

The presence of the attachment will, of course, prevent the wheels 14 from throwing mud, stones, etc. against the engine and other portions of the tractor, and it will be observed that by virtue of its mounting, the attachment will swing from side to side with the wheels 14 as the post 12 is turned, without interfering with steering.

It is believed that the advantages and use of the invention will be readily apparent from the foregoing disclosure and accordingly further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What is claimed as new is:

1. In a tractor, the combination of an upright steering and wheel supporting post having a set of apertures provided in the lower end thereof, a pair of front wheels mounted at opposite sides of said post adjacent the lower end of the latter, and a mud guard attachment comprising an arm provided in one end portion thereof with fastening elements receivable in said apertures whereby said arm is secured to the lower end of said post, said arm extending upwardly and rearwardly from the post between said wheels, an arcuate rib secured to the remaining end of said arm and extending forwardly and downwardly therefrom in a plane intermediate said wheels, and an arcuate guard panel mounted on said rib and projecting to both sides thereof whereby side portions of said panel are disposed in spaced adjacent relation to the periphery of said wheels.

2. In a front wheel mud guard attachment for tractors, the combination of an arm adapted at one end thereof for connection to a steering and wheel supporting post of a tractor, an arcuate rib secured intermediate its ends to the remaining end of said arm and disposed substantially in the plane of said arm, and an arcuate guard panel mounted on said rib and projecting to both sides of the latter.

3. The device as defined in claim 2 together with reinforcing struts extending from end portions of said rib to an intermediate portion of said arm.

DICK A. CAMPBELL.

REFERENCES CITED

The following references are of record in the file of this patent:

UNITED STATES PATENTS

| Number | Name | Date |
|---|---|---|
| 1,404,506 | Young | Jan. 24, 1922 |
| 1,711,223 | Burger et al. | Apr. 30, 1929 |
| 1,811,054 | Kipp et al. | June 23, 1931 |
| 2,473,978 | Van Buskirk | June 21, 1949 |

FOREIGN PATENTS

| Number | Country | Date |
|---|---|---|
| 190,524 | Great Britain | Dec. 19, 1922 |